US012762249B2

(12) United States Patent
Meenakshi et al.

(10) Patent No.: US 12,762,249 B2
(45) Date of Patent: Oct. 13, 2026

(54) SYSTEMS AND METHODS FOR REMEDIATION OF UNKNOWN DIGITAL ASSETS

(71) Applicant: SAP SE, Walldorf (DE)

(72) Inventors: Meenakshi, Bangalore (IN); Sreekanth Kozhisseri Pattath, Budapest (HU); Ayush Jain, Meerut (IN); Sanjeev Peddi Reddi Gari, Bangalore (IN); Rajwin Victor Jesudason, Bangalore (IN); Sreeram V, Palakkad (IN); Shivkumar Chakkenchath, San Ramon, CA (US)

(73) Assignee: SAP SE, Walldorf (DE)

( * ) Notice: Subject to any disclaimer, the term of this patent is extended or adjusted under 35 U.S.C. 154(b) by 117 days.

(21) Appl. No.: 18/913,760

(22) Filed: Oct. 11, 2024

(65) Prior Publication Data

US 2026/0105156 A1 Apr. 16, 2026

(51) Int. Cl.
*G06F 21/57* (2013.01)

(52) U.S. Cl.
CPC .................................. *G06F 21/577* (2013.01)

(58) Field of Classification Search
CPC .................................................... G06F 21/577
See application file for complete search history.

(56) References Cited

U.S. PATENT DOCUMENTS 10,715,542 B1 * 7/2020 Wei ....................... G06F 16/958
2009/0024672 A1 * 1/2009 Martin, Jr. ............ G06F 16/214
2018/0300488 A1 * 10/2018 Sharifi Mehr ........ G06F 21/577
2023/0136945 A1 * 5/2023 Todd .................. G06F 11/3688 714/38.1
2025/0173441 A1 * 5/2025 McNally .............. G06F 21/577

* cited by examiner

*Primary Examiner* — Bradley W Holder
(74) *Attorney, Agent, or Firm* — Fountainhead Law Group, PC

(57) ABSTRACT

Described herein are techniques for the prioritization and remediation of unknown digital assets in computing environments. Unknown digital assets may be analyzed by one or more prioritization rules to generate a risk level for each unknown digital asset. Based on the risk level, a remediation action may be performed on the unknown digital asset. The remediation action to be performed on a remediation date that is also dependent on the risk level. Strategically decommissioning unknown assets may mitigate security risks and improve the operational efficiency of the computing environment.

18 Claims, 9 Drawing Sheets

200

```
{
  "asset_id": "1234567890",
  "asset_name": "Database Server",
  "asset_category": "Critical Infrastructure",
  "management_status": "Actively Managed",
  "historical_activity": "High",
  "network_zone": "Internal Network",
  "valid_asset_metadata": {
    "completeness": "Complete",
    "accuracy": "Accurate"
  },
  "resource_usage": "Moderate",
  "regulatory_compliance": "Compliant"
}
```

*Fig. 2*

Figure 5: Confusion Matrix on Test Data

Figure 6: Confusion Matrix on Validation Data

*Figure 7: Average Impact on Model Output Magnitude*

SYSTEMS AND METHODS FOR REMEDIATION OF UNKNOWN DIGITAL ASSETS

BACKGROUND

Unless otherwise indicated herein, the approaches described in this section are not prior art to the claims in this application and are not admitted to be prior art by inclusion in this section.

In modern IT landscapes, the adoption of cloud environments is on the rise, facilitating the deployment of diverse virtual resources across various platforms. However, this proliferation of cloud-based infrastructures has led to the emergence of unknown assets, which are virtual resources that are either unidentified or untracked within the system. The presence of unknowns introduces significant security vulnerabilities, as they may serve as potential entry points for malicious actors seeking unauthorized access to sensitive data or network resources.

The security implications of unknown assets extend beyond potential breaches, as they also pose challenges in maintaining compliance with regulatory standards and governance protocols. Unknown assets can also inadvertently violate internal policies or regulatory obligations, exposing organizations to legal and financial risks. Moreover, these unknown virtual systems disrupt the efficient allocation and utilization of resources within the multi-cloud environment. Without proper oversight, unknown assets may consume computing resources excessively, leading to inefficiencies and increased operational costs. Thus, there is a need for tools to manage unknown assets within cloud environments.

BRIEF DESCRIPTION OF THE DRAWINGS

FIG. 2 illustrates an example of descriptive or attribute data for a digital asset according to some embodiments.

DETAILED DESCRIPTION

Figure 1:
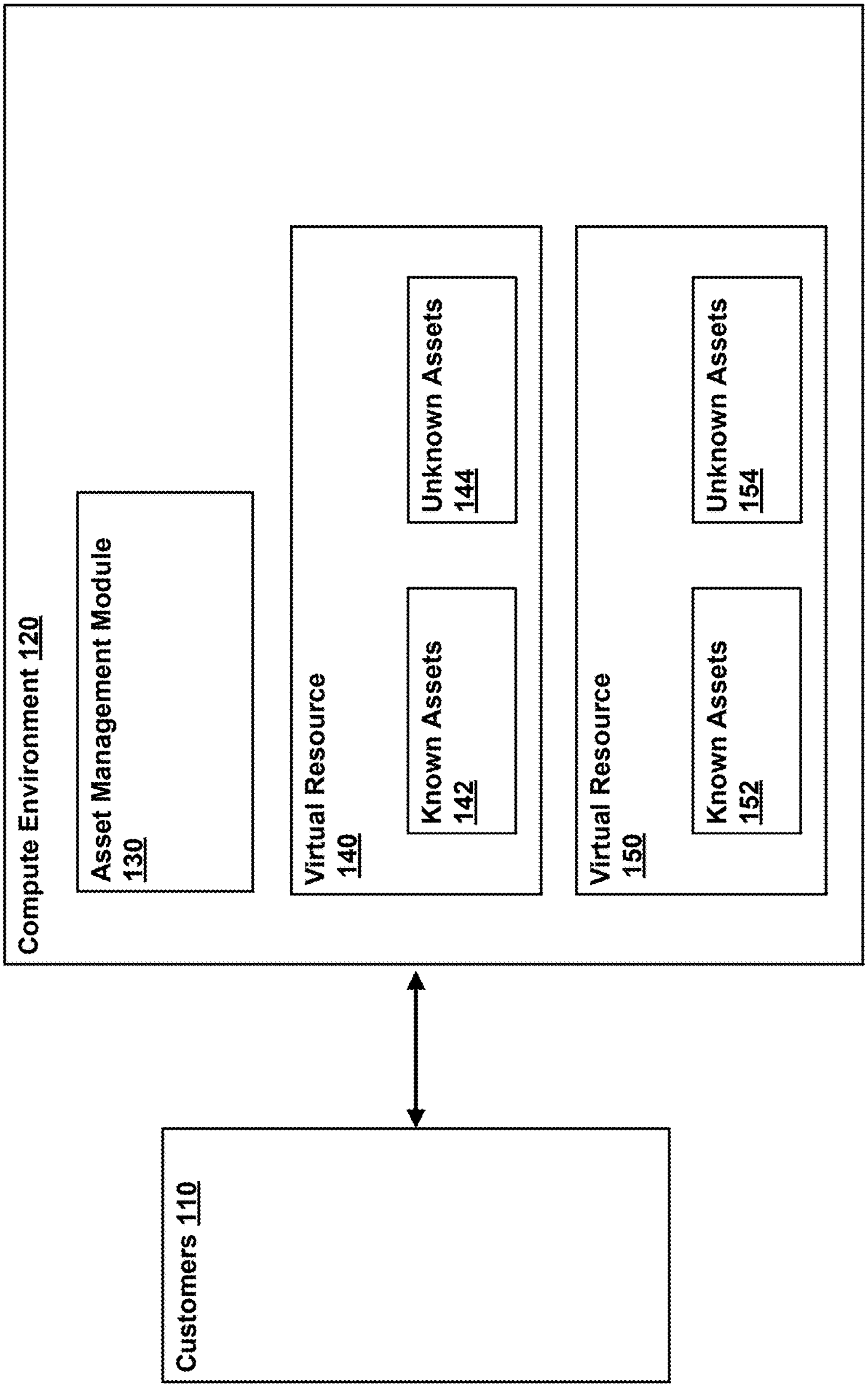
FIG. 1 illustrates a computing environment according to some embodiments.

Described herein are cloud environment solutions, more particularly methods and apparatuses to manage unknown digital assets within virtual resources of a cloud environment. Virtual resources may include virtual machines, virtual networks, containers, virtual storage, virtual desktops, and load balances to name a few. Digital assets belonging to those virtual resources can include databases, files, documents, software applications, media files, configuration files, source code, and digital certificates to name a few.

A digital asset may become unknown. An unknown asset is one that lacks clear classification information to allow a third party, such as a cloud provider, to determine the owner or administrator of that asset. An unknown asset may be unidentified or untracked. An unidentified asset is one in which a proper owner is not associated with virtual asset. This can occur in the case of a divestiture where the parent company established a virtual asset with a cloud provider, but in subsequent divestiture of a branch of the company, the divested company keeps the digital asset, but does not have a contractual relationship with the cloud provider. Thus, the cloud provider lacks the association of the digital asset with the spun-off company. Other scenarios of an asset being or becoming unidentifiable are also possible and within the scope of this disclosure.

An untracked asset is one in which, through the use of other data, the owner of the digital asset cannot reasonably be determined. As an example, an unidentified asset communicates with one and only one known asset, that traffic pattern provides tracking information that could lead to the conclusion that the unidentified asset is associated with the same owner or service provider as the known asset. This would be an example of a tracked asset. However, in other scenarios where the unidentified asset communicates with a plurality of other known assets from many different owners or administrators, using traffic patterns to infer ownership of that asset would not be possible. This would be an example of a tracked asset.

There are many factors that can lead to an asset being unknown. First, inadequate asset management practices can lead to poor documentation and tracking of assets. Rapid scaling and deployment in multi-cloud environments can result in assets being created without proper oversight. Manual processes and human error can cause assets to be misclassified or overlooked. Changes in personnel or organizational restructuring might lead to loss of knowledge about existing assets. Lack of integration between asset management tools and cloud platforms can hinder visibility. Automated systems without regular audits can also miss identifying assets. Lastly, merging different IT systems during acquisitions can result in orphaned assets. Regular audits, comprehensive documentation, and integrated management tools can prevent assets from becoming unidentified or untracked.

Described herein are solutions aimed at addressing the prioritization and remediation of unknown digital assets in computing environments. Unknown digital assets may be analyzed using one or more prioritization rules followed by a priority prediction module to generate a risk level for each unknown digital asset. The risk level measures the susceptibility of the digital asset to potential risks mentioned above. Based on the risk level, a remediation action may be performed on the unknown digital asset. In one example, the remediation action may include scheduling a remediation date in which the unknown asset will be decommissioned, and optionally transmitting notifications about the decommission date. Strategically decommissioning unknown assets may mitigate security risks and improve the operational efficiency of the computing environment. Additionally, decommissioning unknown assets strategically allows a cloud provider to focus on remediating riskier assets before less riskier assets. In addition, some unknown assets that are of lesser risk can be left in the cloud system while the cloud provider attempts to assign that unknown asset to an owner or administrator. This measured approach prevents decommissioning unknown assets in a shot-gun approach which could unnecessarily disrupt cloud services for some users.

FIG. 1 illustrates a computing environment according to some embodiments. Computing environment 120 includes virtual resource 140 and virtual resource 150. Virtual resources may include virtual machines, virtual networks, containers, virtual storage, virtual desktops, and load balancers to name a few. These virtual resources may be offered to customers 110 as cloud services. Customers may in turn utilize these virtual resources, thus reducing the number of physical resources managed and maintained by the customer. Virtual resource 140 includes digital assets, which can include databases, files, documents, software applications, media files, configuration files, source code, and digital certificates to name a few. Digital assets are separated into two groups-known assets 142 and unknown assets 144. Known assets are digital assets that are identified and tracked. This means that the ownership can be identified (e.g., using a database listing assets and their owners) and usage history can be tracked. Unknown assets are digital assets which are unidentified and untracked. This means that the ownership and usage history is unknown or untraceable. Virtual resource 150 also includes known assets 152 and unknown assets 154.

Compute environment 120 further includes asset management module 130. Asset management module 130 is configured to manage the digital assets within the virtual resources of compute environment 120. Asset management module 130 may analyze digital assets within one or more virtual resources to distinguish known assets from unknown assets. Once distinguished, asset management module 130 may apply one or more prioritization rules to the unknown assets. Each prioritization rule alters the priority value for the unknown digital asset and the priority value may be used to assign a risk level to the unknown digital asset. The risk level in turn may be used by asset management module 130 to prioritize the decommissioning of unknown digital assets. In one embodiment, the date and time to decommission an unknown digital asset may depend on the risk level assigned to the unknown digital asset. For example, an unknown digital asset with a high risk level may have a decommission date that is sooner than another unknown asset with a low risk level. Decommissioning unknown digital assets may mitigate security risks since unknown digital assets serve as potential entry points for malicious actors seeking unauthorized access to sensitive data within compute environment 120. In addition, as noted earlier, a strategic approach to decommissioning unknown asset will improve overall security and compliance without unnecessarily degrading cloud performance (e.g., decommissioning an asset that is currently, and properly, being utilized).

FIG. 2 illustrates an example of descriptive or attribute data for a digital asset according to some embodiments. As shown, digital asset 200 contains attributes, including "asset_id," "asset_name," "asset_category," "management_status," "historical_activity," "network_zone," "valid_asset_metadata," "resource_usage," and "regulatory_compliance." Attribute "valid_asset_metadata" further includes sub-attributes "completeness" and "accuracy." In other examples, more or fewer attributes may be included in a digital asset. Attributes of the digital asset 200 may be analyzed to initially determine whether a digital asset is known or unknown. In one such embodiment, a database could be queried using one attribute, such as asset_id, to determine if an associated owner or administrator is linked to that asset_id. Once a determination is made that an asset is unknown, attributes of digital asset 200 may be analyzed to assign a risk level to the unknown digital asset. The risk level may indicate the level of risk if the unknown digital asset remains active or commissioned in the virtual resource. For example, a risk level may be assigned to an unknown digital asset to indicate the level of risk if the unknown digital asset remains commissioned in the virtual resource. The risk level may be used to help prioritize the decommissioning of unknown digital assets. For instance, an unknown asset with a higher risk level may be decommissioned before an unknown asset with a lower risk level. In one example, the risk level of known assets can be presumed to be zero.

Figure 3:
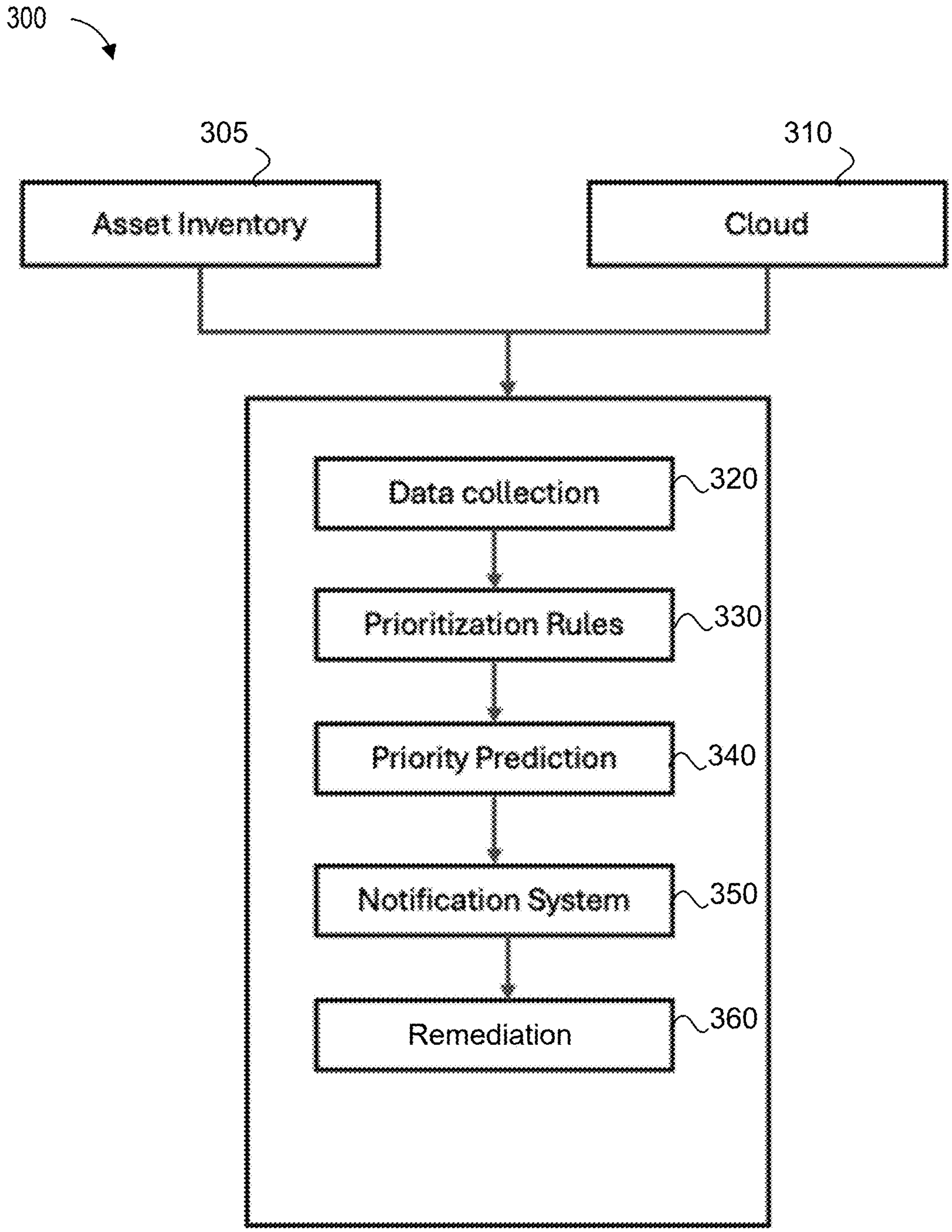
FIG. 3 illustrates a high level architecture for managing digital assets according to some embodiments.

FIG. 3 illustrates a high level architecture for managing digital assets according to some embodiments. Architecture 300 may be implemented in computer readable software and executed by a processor. The processor may be within the computing environment (i.e., managed locally) or may be external from the computing environment (i.e., managed remotely). Architecture 300 includes data collection module 320 which acts as the foundation for gathering information on digital assets within the organization's computing environment. By interfacing with asset inventory 305 and Cloud API 310, data collection module 320 retrieves comprehensive data, including metadata and ownership details, for each digital asset. This data serves as the basis for subsequent analysis and decision-making processes. The data collection module 320 gathers data related to assets' behavior, network zone, exposure level, asset status, asset built by, application, resource consumption, owner and other asset related tags within the multi-cloud environment. This data gathering may include the some or all of the descriptive and attribute data shown in FIG. 2. To collect data the data collection module 320 accesses various data sources within the multi-cloud environment. For example, data collection module 320 can interface with Cloud Service APIs of the cloud service providers such as Azure/GCP/Converge Cloud hosting the assets. Data collection module may retrieve information such as hostname, IP address, data center, managed asset, lifecycle status, built at, built by, asset status, application, network zone, owner, network rules related to the assets and store the data in Splunk. Furthermore, data collection module 320 may collect data about the utilization of computing resources (CPU, memory, storage) by the assets to understand their resource consumption patterns.

In one embodiment, data collection may include a network scanner detecting network connected devices through active (ping sweeps) and passive (traffic analysis) methods. Agent-based discovery tools may then collect detailed information from the connected devices using installed agents. Cloud API integration may then allow discovery of virtual resources by connecting with cloud service provider APIs. Configuration Management Databases (CMDBs) may then be queried to validate and enrich asset data. Software inventory tools may identify and track installed software across devices. Endpoint detection tools may find connected assets, including unmanaged devices like IoT. Automated scripts may run periodically to discover specific assets. Integration with DevOps tools may ensure detection of dynamically created assets. Physical audits may manually verify assets, complementing automated methods. Regular audits and reconciliation may keep the asset inventory accurate and up to date.

Once the data on the digital assets has been collected, the descriptive or attribute data of the assets undergoes evaluation within prioritization rules engine 330. Prioritization rules engine 330 may apply a series of prioritization rules to filter known assets from unknown assets and then assess the risk level associated with each unknown digital asset. The series of prioritization rules may be formulated as weak decision trees. These rules consider various factors such as asset categorization, management status, and historical activity to determine the preliminary priority score for each asset.

In one embodiment, one or more factors are selected for identifying and assessing key attributes for evaluating unknown assets within cloud environments. The factors may be selected depending on the information that is available for the digital asset. These factors encompass a broad spectrum of considerations, ranging from asset categorization and management status to historical activity, network zone, valid asset metadata, and resource usage. Each factor offers valuable insights into the characteristics and behavior of unknown assets, guiding decision-making processes aimed at optimizing security posture and resource utilization. Each factor may generate a priority score that indicates the level of security risk according to the factor. When selecting factors for constructing decision trees within the prioritization rules engine, it is important to consider attributes that are indicative of security risks, compliance concerns, and operational efficiency within cloud and multi-cloud environments. A short description of a few exemplary factors are included below.

Asset Categorization—

Asset categorization classifies assets based on their type, function, and/or criticality within the organization's infrastructure. The categories for asset categorization can include critical infrastructure, sensitive data repositories, non-critical application, and unknown. Assets that are classified as critical infrastructure pose higher security risk and therefore require prioritized remediation. As a result, critical infrastructure assets are assigned a higher priority score to account for heightened security implications. Similarly, assets that are classified as sensitive data repositories pose higher security risk and are assigned a higher priority score. Conversely, the priority score is lowered for non-critical applications, reflecting their lower impact on security and operational continuity. In one embodiment, the categories with the highest to lowest priority score may be ordered as critical infrastructure, sensitive data repositories, unknown, and non-critical applications.

Management Status—

Management status determines how assets are managed by the organization. The categories for management status can include actively managed, unmanaged, monitored, supervised, and deprecated. Actively managed assets are subject to regular monitoring and maintenance and therefore are assigned a lower priority score as they exhibit higher resilience against security threats. In contrast, unmanaged assets lack adequate supervision and pose elevated security risks so therefore are assigned a higher priority score. Assets marked as deprecated indicate obsolescence or pending decommissioning and therefore may be assigned a lower priority score to reflect the transactional status. Supervised assets receive occasional checks and maintenance but do not have continuous oversight that actively managed assets do and therefore are assigned a medium priority score, indicating moderate level of risk. Monitored assets are regularly observed for irregular activities but may not receive proactive maintenance and therefore are given a moderately high priority score, reflecting the need for increased attention as compared to actively managed assets. In one embodiment, the categories with the highest to lowest priority score may be ordered as unmanaged, monitored, supervised, deprecated, and actively managed.

Historical Activity—

Historical activity analyzes past usage patterns, access frequency, and interactions with the digital asset. The analysis results in assigning a historical activity level of high, moderate or low to the digital asset. Assets with high historical activity, characterized by frequent access or irregular usage patterns, are flagged for heightened security and assigned higher priority score. As such, high historical activity may be assigned a higher priority score. Alternatively, assets with moderate or low historical activity levels are allocated lower priority scores, reflecting their comparatively lower risk profiles. In one embodiment, the historical activity levels with the highest to lowest priority score may be ordered as high, medium, and low.

Network Zone—

Network zone may identify the network segment or zone within which the digital asset resides to evaluate its exposure to external threats and vulnerabilities. The zones may include internal network, DMZ (Demilitarized Zone), external-facing, and unknown. Assets situated within the internal network, shielded from external access, are assigned relatively lower priority scores due to their reduced susceptibility to external attacks. Conversely, assets located in the DMZ or designated as external facing are deemed to be more exposed to external threats and are therefore assigned higher priority scores. Assets with an unknown network zone, lacking clear designation, are accorded the highest priority scores, reflecting the uncertainty surrounding their security posture. In one embodiment, the network zones with the highest to lowest priority score may be ordered as unknown, external-facing, DMZ, and internal network.

Valid Asset Metadata—

Valid asset metadata analyzes the completeness and accuracy of the metadata belonging to the digital asset. Analysis may conclude that the metadata is complete vs. incomplete (relative to presence or absence of data) or accurate vs inaccurate (data exists but is incorrect such as in an improper format or meaning). Metadata that is incomplete or inaccurate may lead to mismanagement or compliance issues and therefore may be assigned a higher priority score reflective of their elevated security risks and compliance concerns. In contrast, metadata that is complete is less likely to have compliance and management issues. Assets with complete metadata, encompassing comprehensive descriptions, ownership details, and configuration information, are considered to be well-documented and managed and as a result, are assigned lower priority scores indicative of their lower security risks. In one embodiment, the metadata analysis with the highest to lowest priority score may be ordered as incomplete/inaccurate to complete/accurate.

Resource Usage—

Resource usage analyzes resource consumption, such as CPU, memory, and storage. The analysis may result in the assignment of a usage level of high, medium, or low. Digital assets exhibiting high usage level may indicate potential inefficiencies or potential security incidents and are flagged for heightened scrutiny and therefore are assigned a higher priority score. In contrast, digital assets with medium or low usage level may be considered less resource-intensive and assigned a lower priority score. In some embodiments, a usage level can be assigned for each resource (CPU, memory, storage), which are then combined to generate an overall usage level score. In one embodiment, the resource usage with the highest to lowest priority score may be ordered as high, medium, and low.

Regulatory Compliance—

Regulatory Compliance assesses adherence and compliance to regulatory standards, internal policies, or industry regulations. The compliance status may be set to compliant, non-compliant, and unknown. Assets found to be compliant with relevant regulations and internal policies are assigned lower priority score, reflecting their alignment with established compliance frameworks and reduced risk of legal or financial consequences. Conversely, assets identified as non-compliant, failing to meet regulatory requirements or internal policies, are assigned a higher priority score indicative of heightened compliance and security risks. Assets with an unknown compliance status, lacking clarity regarding their regulatory compliance status, are assigned intermediate priority score, reflecting the uncertainty surrounding their compliance posture. In one embodiment, the regulatory compliance with the highest to lowest priority score may be ordered non-compliant, unknown, and compliant.

The outputs of prioritization rules engine 330 are then combined within the priority prediction module 340 to generate a risk level for the digital asset. In one embodiment, the risk level is generated by summing up the priority scores received from the prioritization rules engine for each factor. The resulting risk level provides a holistic measure of the asset's risk profile, guiding decision-making processes related to asset management, security remediation, and resource allocation within the multi-cloud environment. Through this systematic approach, organizations can effectively prioritize the decommissioning of unknown assets based on their impact on security, compliance, and operational continuity, thereby enhancing overall risk management and governance capabilities. In another embodiment, the priority scores generated for each factor are weighted and combined to generate a risk level score for the digital asset. In yet another embodiment, advanced boosting techniques are employed to enhance the predictive accuracy of individual decision trees, resulting in a robust assessment of the attack surface priority for each unknown asset. The priority prediction module 340 may assign numerical values (i.e., a risk level) to prioritize unknown assets based on their susceptibility to potential attacks, with higher values indicating greater risk.

The risk level for each unknown digital asset may then be passed to notification system 350. Notification system 350 may act as a communication hub, receiving the prioritized list of unknown assets and their corresponding risk level from the priority prediction module 340. Notification system may disseminate real-time notifications to relevant stakeholders within the organization, alerting them of identified security risks. In one example, notification system may send notification emails to decision makers of the cloud provider with the list of unknown assets and optionally, the decommission date provided by the remediation module. In one embodiment, a notification is sent to a decision maker of where the unknown asset resides so that the decision maker can make decisions regarding decommissioning or removal of the unknown asset. This facilitates prompt collaboration and decision-making among IT administrators, security teams, and asset owners to expedite the remediation process.

Finally, the remediation module 360 takes actionable steps to address the identified security vulnerabilities. Leveraging the prioritized list of unknown assets, remediation module 360 may initiate automated or manual remediation actions, such as asset reclassification, access restriction, or decommissioning. Asset reclassification is classifying the asset as a different class, such as deprecated. Asset restriction is restricting access to the asset, such as only to the administrators. Asset decommissioning is the deletion of the asset from the system. Remediation module 360 tracks the progress of remediation efforts and provides feedback to the Notification System 350 for further updates and notifications to stakeholders. For example, emails may be sent to decision makers such as administrators of the cloud provider about the upcoming decommission dates for the unknown assets, plus a follow up email once the unknown asset has been decommissioned.

While FIG. 3 illustrates one way to generate the risk level value for each unknown digital asset through a weighted combination of the priority scores corresponding to the selected factors, described herein is another technique to generate the risk value score. In one embodiment, an administrator or user may define the factors to consider when generating the risk score and integrate those factors into an algorithm. Each factor in the algorithm is analyzed and the priority score can be increased or decreased according to the analysis. The algorithm may be derived from domain expertise, best practices, and organizational policies related to asset management, security, and compliance. By incorporating these rules into the decision-making process, the engine or program can systematically evaluate unknown assets and assign preliminary priority scores based on their adherence to predefined criteria. To begin, the algorithm may initiate by setting the priority score of the unknown digital asset to zero, indicating a neutral starting point. Subsequently, the priority score may be adjusted through the evaluation process across various factors. Upon completion of the evaluation process across all decision criteria, the algorithm computes the total Priority Score for each unknown asset.

In some embodiments, a machine learning model may be utilized to generate a risk level value or a remediation date for each unknown digital asset. For example, Extreme Gradient Boosting (XGBoost) model may be employed to analyze selected features (i.e., the descriptive or attribute data) of the unknown digital assets to generate a corresponding remediation date. XGBoost is an ensemble machine learning model that combines the prediction of multiple weak decision trees to produce a strong prediction. It also utilizes boosting techniques that sequentially creates decision trees where each tree improves upon the mistakes of the previous one. XGBoost may be used for many machine learning tasks such as classification and regression. The dataset may be divided into training, validation, and testing (60:20:20 ratios) sets. The training set may be used to train the model, the validation set may be used for hyperparameter tuning, and the testing set may be used to evaluate the final model's performance.

Model Training:

Before model training, the model is initialized by initializing the chosen algorithm with one or more of the following hyperparameters: booster, max_depth, eta, objective, subsample, lambda, eval_metric, num_class. After model initialization, the model is trained using the training dataset. During training, the model learns the relationships between the selected features and the ground truth (optimal remediation date). In one example, 'multi:softprob' is used as the loss function for the model.

Hyperparameter Tuning:

In hyperparameter tuning, the values of the initialized hyperparameters in the model are tuned to find the best combination of hyperparameters that optimize the model's performance. The figure below shows an exemplary combination of hyperparameters used to train the model.

| | |
|---|---|
| Booster | gbtree |
| Max_depth | 6 |
| Eta | 0.3 |
| Objective | Multi:softprob |
| Subsample | 0.5 |
| Lambda | 2 |
| Eval_metric | mlogloss |
| num_class | 6 |

Figure 4:
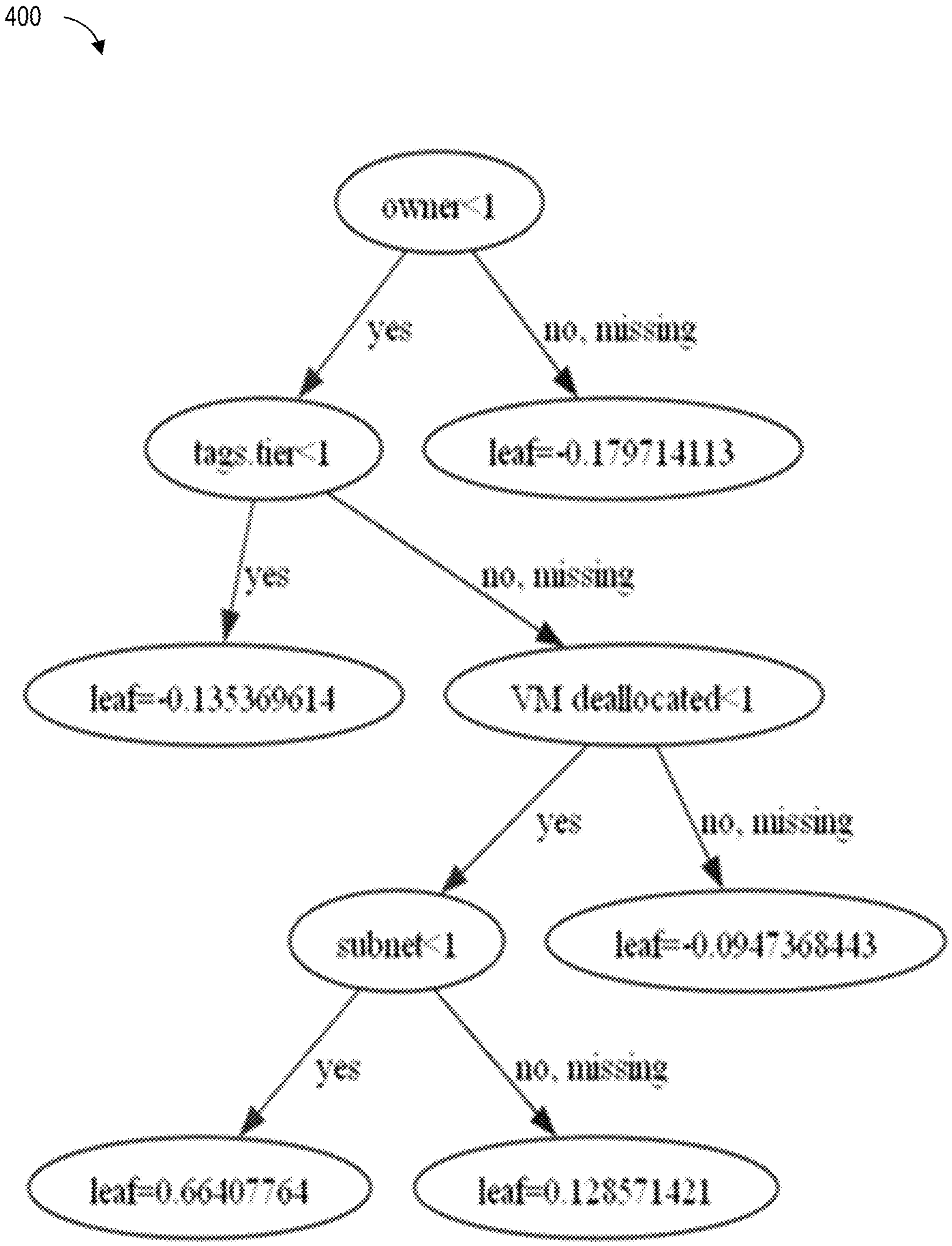
FIG. 4 illustrates an exemplary decision tree in the XGBoost ensemble model according to some embodiments.

Decision Tree Visualization:

The complexity of decision trees can sometimes make it challenging to understand the model's decision logic, the significance of features, and the potential for overfitting. In one embodiment, a graphical representation of a specific tree within the model can be generated using a tree plotting function. FIG. 4 illustrates an exemplary decision tree in the XGBoost ensemble model according to some embodiments. The values in the leaf nodes represent the raw score for each class, which can in turn be converted to a probability score by using a logistic function. The visualization of the decision tree may aid a user in understanding the model's decision-making process. In one embodiment, the decision tree may be presented on a graphical user interface of a display so that a user such as an administrator of the cloud provider can better understand the model's decision-making process.

Figure 5:
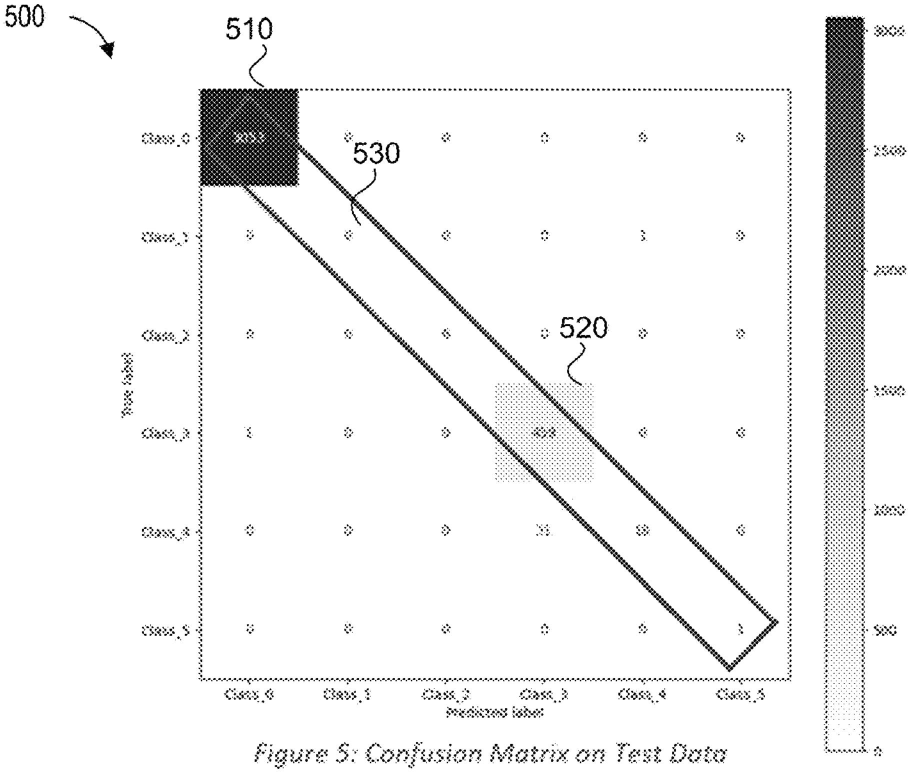
FIG. 5 illustrates a confusion matrix plot for test data according to some embodiments.
Figure 6:
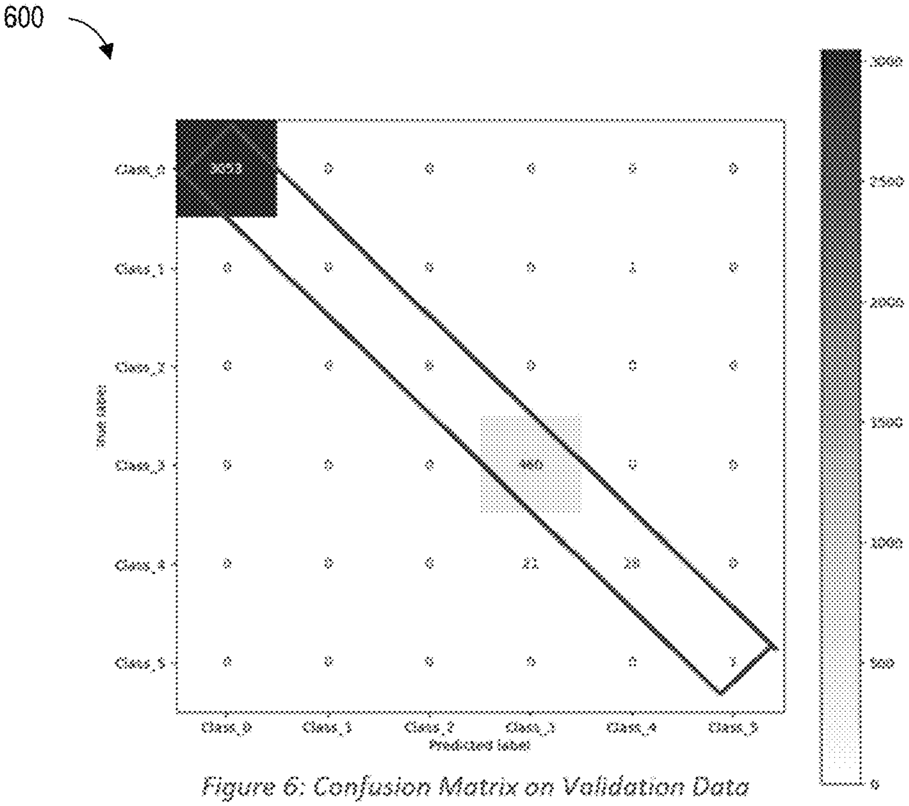
FIG. 6 illustrates a confusion matrix plot for validation data according to some embodiments.

Model Validation and Evaluation:

Model validation is the process to validate the trained model's performance using the validation dataset. Validating the performance helps ensure the model's generalization capability. In one embodiment, assessment criteria such as the confusion matrix and F1 score may be employed to gauge the precision of predictions generated by the model. FIG. 5 illustrates a confusion matrix plot for test data according to some embodiments. As shown, the diagonal rectangular box emphasizes the count of accurately predicted labels in the test data. For example, the square corresponding to a true label of Class_0 and a predicted label of Class_0 implies that the prediction of the model is correct. Here, square 510 indicates that there were 3053 accurately predicted labels in the test data for Class_0. Similarly, square 520 indicates that there were 459 accurately predicted labels in the test data for Class_3 and square 530 indicates that there were 0 accurately predicted labels in the test data for Class_2. FIG. 6 illustrates a confusion matrix plot for validation data according to some embodiments. Similar to FIG. 5, the diagonal rectangular box emphasizes the count of accurately predicted labels in the validation data.

Figure 7:
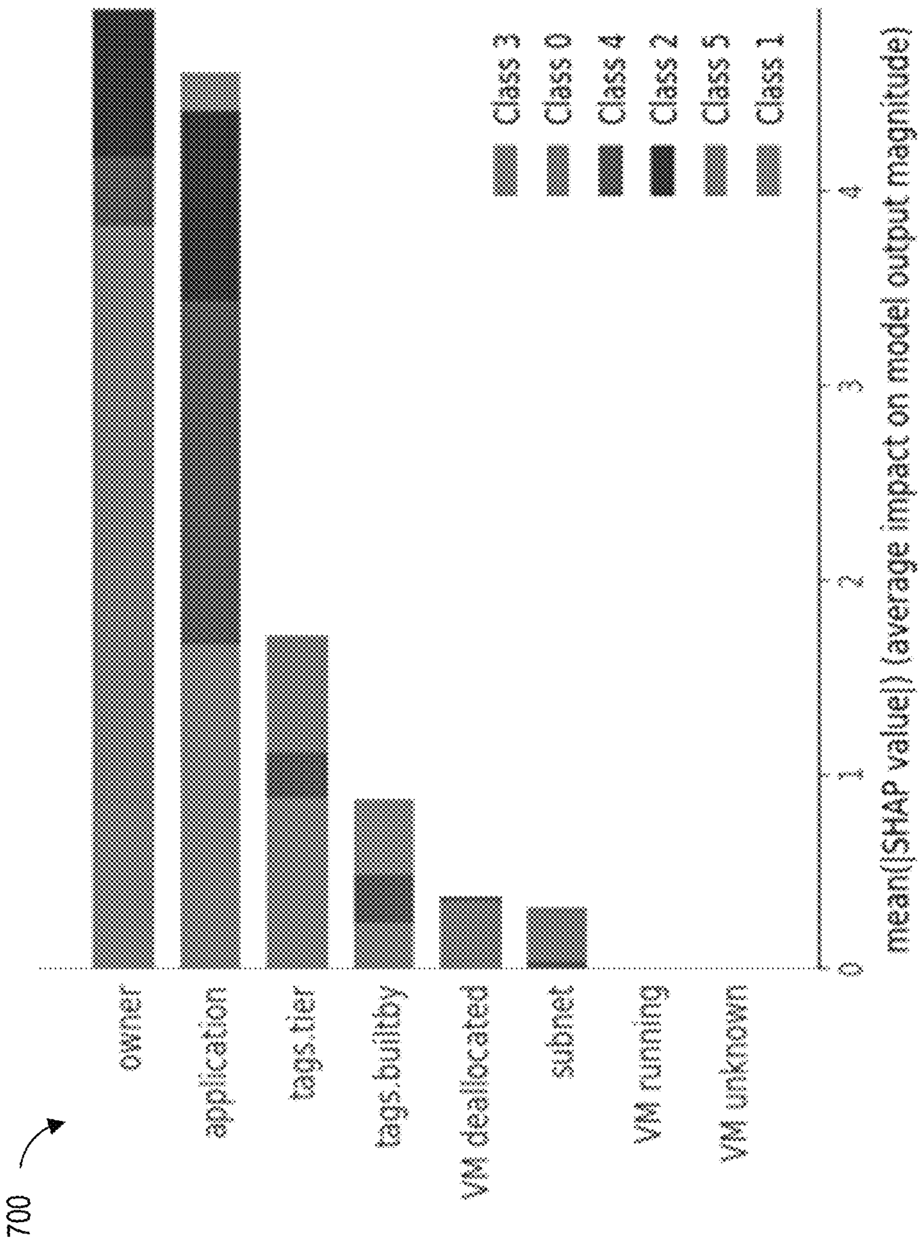
FIG. 7 illustrates one example of a chart for visualizing the importance of different features according to some embodiments.

Reinforcement and Continuous Learning:

In one embodiment, the model may be refined periodically. This may be due to new data being available or updating the model periodically with fresh data to improve accuracy. The model may adapt to changing usage patterns and service level agreement behaviors to ensure predictions remain accurate over time. Understanding the impact of each feature on the model's decision-making process may help identify features that are more important to the model. In one embodiment, SHAP values for each feature across all samples are utilized and the features are ranked based on the total magnitude of their SHAP values. SHAP values are based on game theory and assign an importance value to each feature in a model. Features with a positive SHAP value positively impacts the prediction while a negative SHAP value negatively impacts the prediction. FIG. 7 illustrates one example of a chart for visualizing the importance of different features according to some embodiments. As shown, the impact of each feature has an impact to a class. The impact across the classes are added up to form the bar for each feature. The owner feature is the most important to the prediction since it corresponds to the longest bar and the application feature is the second most important after the owner feature since it corresponds to the second longest bar. Chart 700 may be presented in a GUI of a display so that an administrator of the could provider can visually determine which features have the largest impact to the prediction.

Figure 8:
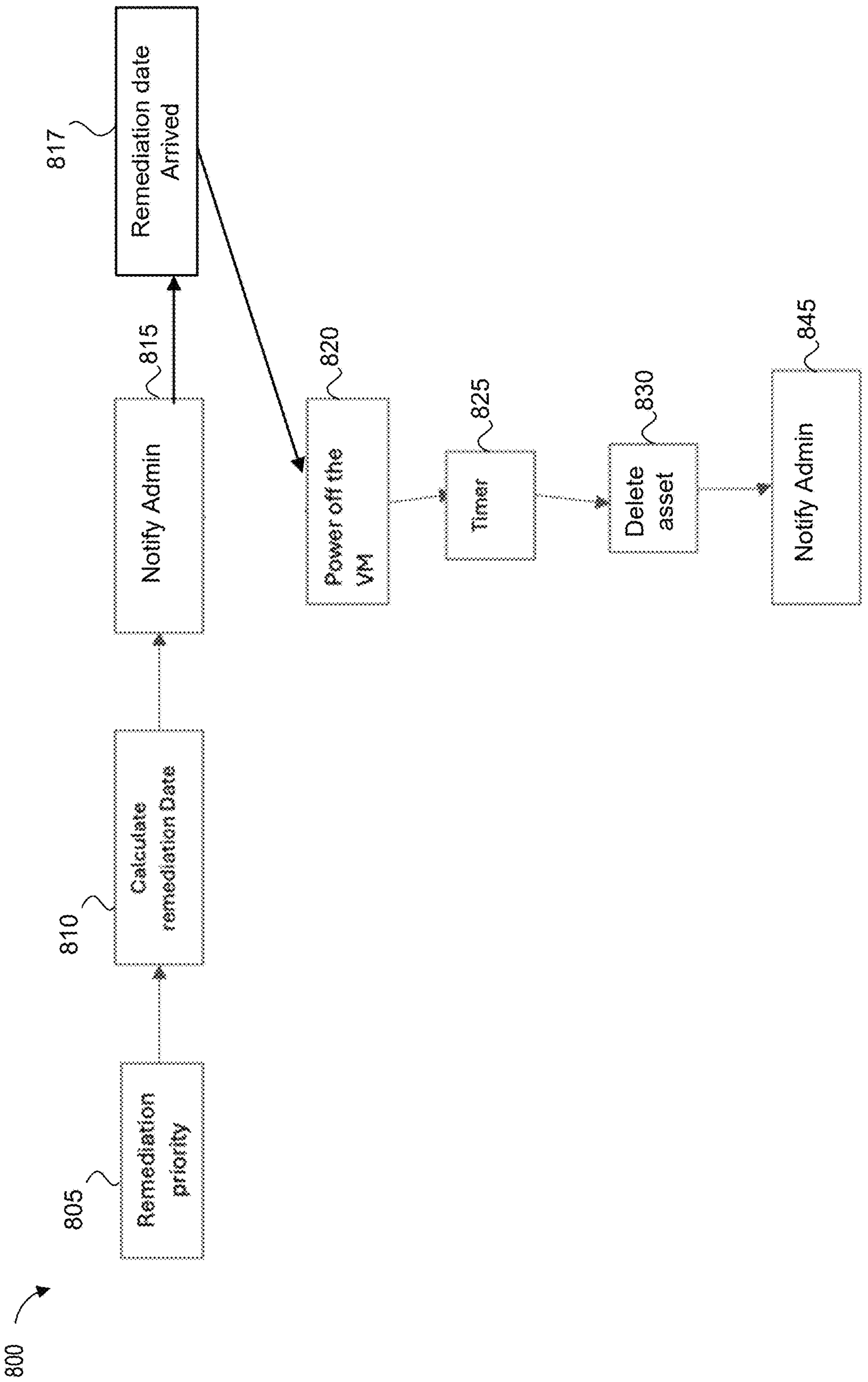
FIG. 8 illustrates a workflow for remediation of digital assets according to some embodiments.

FIG. 8 illustrates a workflow for remediation of digital assets according to some embodiments. Workflow 800 may be implemented in computer readable code to be executed by a processor. Workflow 800 begins by determining the remediation priority at step 805. The remediation priority may be the same as the risk level of the unknown digital asset. This can be completed by retrieving the risk level corresponding to the unknown digital asset. Workflow 800 then continues by calculating the remediation date at 810. The remediation date is a future date in which a remediation actions, such as asset reclassification, access restriction, or decommissioning, is to be performed on the unknown asset. The remediation date may be a date on the calendar or alternatively may be a number of days (or business days) in the future from today. In one embodiment, the remediation date may be calculated through the use of a look up table. Below is an example of a look up table where the higher risk level values correspond to shorter remediation time frames. For example, if the risk level value of the unknown asset is class 5, then the unknown asset is assigned a remediation date of 1 day. This would mean that the unknown asset should be scheduled to be decommissioned in one day. Similarly, if the risk level of an unknown asset is class 0, there may be no remediation date set which means that the unknown asset is not going to be decommissioned. In other embodiments, other algorithms may be applied to generate a remediation date based on the risk level associated with the unknown asset.

| Risk Level | Remediation Date |
|---|---|
| Class 5 | 1 day |
| Class 4 | 3 days |
| Class 3 | 5 days |
| Class 2 | 7 days |
| Class 1 | 14 days |
| Class 0 | NA |

Once the remediation date is calculated, an administrator, such as one associated with a cloud provider, is notified at step 815. The notification may include the list of unknown assets that are going through remediation and also the remediation date corresponding to those unknown assets. The notification may be sent through email, push notifications, or other forms of notifications. When the remediation date has arrived at step 817, workflow 800 continues by performing the remediation action. If the remediation action is to decommission the asset, then workflow 800 may power off the virtual machine (VM) storing the unknown asset at step 820 and optionally waiting a period of time at step 825 to ensure that access to the VM has halted. Workflow 800 then continues by deleting the asset at 830 from the VM. Once deleted, the administrator is notified of the deletion at step 845 and the VM is powered back on.

Figure 9:
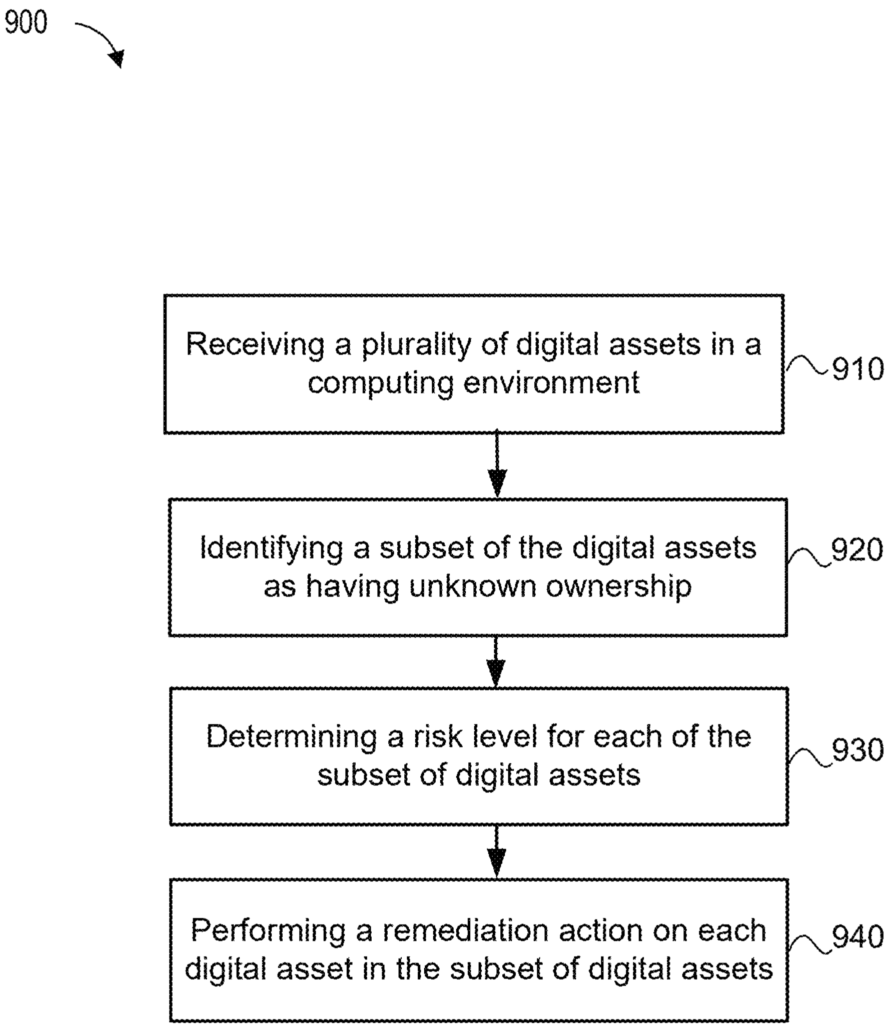
FIG. 9 illustrates a workflow for management of digital assets according to some embodiments.

FIG. 9 illustrates a workflow for management of digital assets according to some embodiments. Workflow 900 may be implemented as part of a software program that is stored in computer-readable medium to be executed by a processor. Workflow 900 begins by receiving attribute or description data from a plurality of digital assets in a computing environment at 910. In one embodiment, the computing environment is scanned for digital assets. Workflow 900 then continues by identifying a subset of the digital assets as having unknown ownership. In one embodiment, metadata belonging to the digital assets may be examined or analyzed to identify ownership of the digital assets. The ownership of the digital asset may be stored as metadata belonging to the digital asset or a combination of different attributes in the metadata can be analyzed to determine the ownership. Digital assets which do not have ownership or have unknown ownership may be grouped together to be analyzed for remediation.

Workflow 900 continues by determining a risk level for each of the subset of digital assets at 930. The risk level may be calculated by a priority prediction module and prioritization rules. The risk level may represent the security risk associated with the digital asset. One or more of the factors described above may be evaluated and combined to generate the risk level. Once the risk level has been determined for the digital assets, workflow 900 continues by performing a remediation action on each digital asset in the subset of digital assets at 940. Performing the remediation action can include scheduling a remediation date to perform the remediation action. In one embodiment, the remediation date of a digital asset may depend on the risk level corresponding to the digital asset. For example, a digital asset with a high risk level may have an earlier remediation date scheduled than a digital asset with a low risk level. In one embodiment, the location where the digital asset is stored may be factor in setting the remediation date. It may be advantageous to schedule digital assets stored on the same VM to have the same remediation date since multiple digital assets may be decommissioned while the VM is shut down. In one example, a scheduling table may be maintained indicating when VMs will be shut down, which may be utilized as a weighted factor in determining the remediation date.

Figure 10:
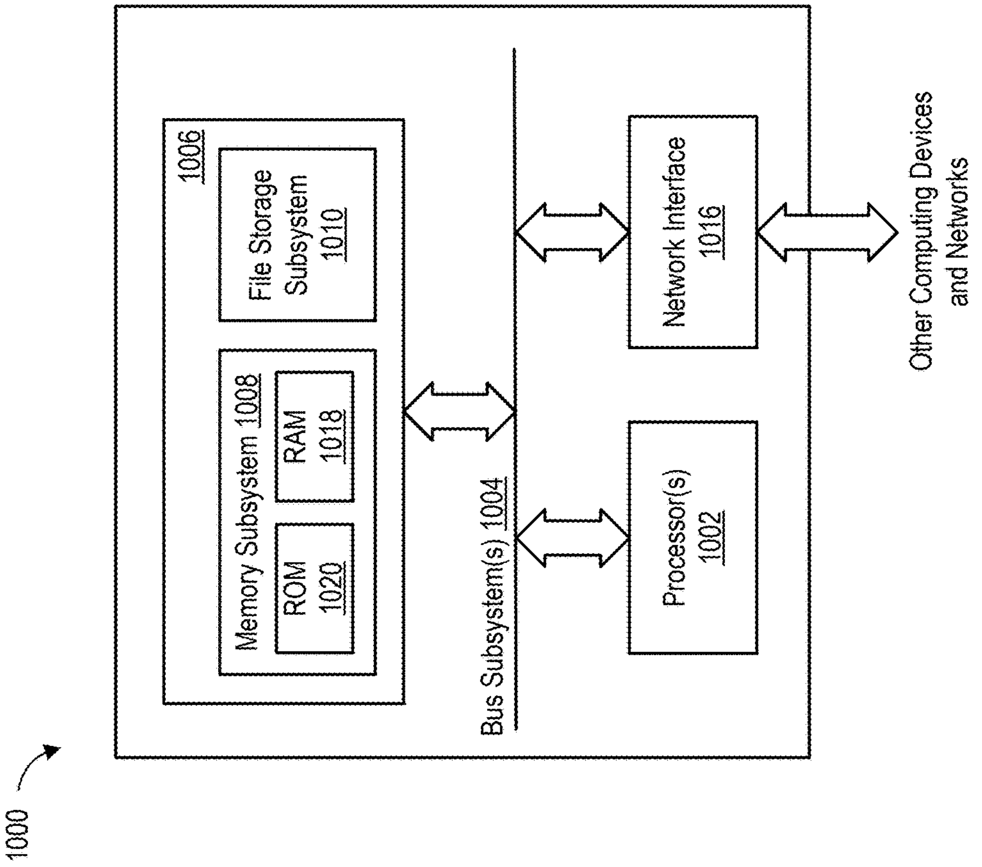
FIG. 10 depicts a simplified block diagram of an example computer system, which can be used to implement some of the techniques described in the foregoing disclosure.

FIG. 10 depicts a simplified block diagram of an example computer system, which can be used to implement some of the techniques described in the foregoing disclosure. As shown in FIG. 10, system 1000 includes one or more processors 1002 that communicate with several devices via one or more bus subsystems 1004. These devices may include a storage subsystem 1006 (e.g., comprising a memory subsystem 1008 and a file storage subsystem 1010) and a network interface subsystem 1016. Some systems may further include user interface input devices and/or user interface output devices (not shown).

Bus subsystem 1004 can provide a mechanism for letting the various components and subsystems of system 1000 communicate with each other as intended. Although bus subsystem 1004 is shown schematically as a single bus, alternative embodiments of the bus subsystem can utilize multiple buses.

Network interface subsystem 1016 can serve as an interface for communicating data between system 1000 and other computer systems or networks. Embodiments of network interface subsystem 1016 can include, e.g., Ethernet, a Wi-Fi and/or cellular adapter, a modem (telephone, satellite, cable, etc.), and/or the like.

Storage subsystem 1006 includes a memory subsystem 1008 and a file/disk storage subsystem 1010. Subsystems 1008 and 1010 as well as other memories described herein are examples of non-transitory computer-readable storage media that can store executable program code and/or data that provide the functionality of embodiments of the present disclosure.

Memory subsystem 1008 comprise one or more memories including a main random access memory (RAM) 1018 for storage of instructions and data during program execution and a read-only memory (ROM) 1020 in which fixed instructions are stored. File storage subsystem 1010 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that system 1000 is illustrative and many other configurations having more or fewer components than system 1000 are possible.

The above description illustrates various embodiments of the present invention along with examples of how aspects of the present invention may be implemented. The above examples and embodiments should not be deemed to be the only embodiments and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

FURTHER EXAMPLES

Each of the following non-limiting features in the following examples may stand on its own or may be combined in various permutations or combinations with one or more of the other features in the examples below. In various embodiments, the present disclosure may be implemented as a processor or method.

In some embodiments the present disclosure includes a method, comprising: receiving a plurality of digital assets in a computing environment, identifying a subset of the plurality of digital assets having unknown ownership, determining a risk level for each digital asset in the subset of digital assets, wherein the risk level measures a susceptibility of each digital asset to potential attacks, and performing a remediation action on each digital asset in the subset of digital assets, wherein the remediation action is based on the risk level of each digital asset.

In one embodiment, the method further comprises transmitting a notification associated with a digital asset from the subset of digital assets when the risk level corresponding to the digital asset is greater than a predefined threshold.

In one embodiment, wherein determining a risk level for each digital asset includes applying a plurality of prioritization rules to a digital asset from the subset of digital assets to generate a plurality of priority scores and generating the risk level for the digital asset based on the plurality of priority scores.

In one embodiment, performing the remediation action includes calculating a remediation date based on the risk level of a digital asset, wherein the remediation date corresponds to a date to decommission the digital asset and notifying an owner of the digital asset of the remediation date.

In one embodiment, a prioritization rule classifies the digital asset into one of a plurality of predefined categories based on a type parameter of the digital asset, a functionality of the digital asset, and a criticality parameter of the digital asset.

In one embodiment, a prioritization rule determines whether the digital asset is actively managed, monitored, deprecated, or supervised.

In one embodiment, a prioritization rule determines an activity level of the digital asset.

In one embodiment, a prioritization rule determines a network segment within which the digital asset resides.

In one embodiment, a prioritization rule analyzes the completeness and accuracy of metadata belonging to the digital asset.

In one embodiment, a prioritization rule evaluates resource consumption of the digital asset.

In one embodiment, a prioritization rule evaluates whether the digital asset complies with a regulatory standard, an internal policy, or an industry regulation.

In one embodiment, determining the risk level for each digital asset includes applying a machine learning model to the attribute data corresponding to a digital asset from the subset of digital assets to generate a risk level.

In one embodiment, the method further comprises visualizing a decision tree within the machine learning model on a graphical user interface of a display.

In one embodiment, the machine learning model is validated using a confusion matrix.

In one embodiment, the method further comprises generating SHAP values corresponding to the attribute data and determining one or more important features within the attribute data based on the SHAP values.

In some embodiments, a system comprises one or more processors; a non-transitory computer-readable medium storing a program executable by the one or more processors, the program comprising sets of instructions for: receiving a plurality of digital assets in a computing environment, identifying a subset of the plurality of digital assets having unknown ownership, determining a risk level for each digital asset in the subset of digital assets, wherein the risk level measures a susceptibility of each digital asset to potential attacks, and performing a remediation action on each digital asset in the subset of digital assets, wherein the remediation action is based on the risk level of each digital asset.

In some embodiments, a non-transitory computer-readable medium stores a program executable by one or more processors, the program comprising sets of instructions for comprising: receiving a plurality of digital assets in a computing environment, identifying a subset of the plurality of digital assets having unknown ownership, determining a risk level for each digital asset in the subset of digital assets, wherein the risk level measures a susceptibility of each digital asset to potential attacks, and performing a remediation action on each digital asset in the subset of digital assets, wherein the remediation action is based on the risk level of each digital asset.

What is claimed is:

1. A method, comprising:

receiving, from one or more cloud service application programming interfaces (APIs), attribute data associated with a plurality of digital assets in a computing environment deployed within a computing environment comprising a plurality of virtual resources;

identifying, by an asset management module, a subset of the plurality of digital assets having unknown ownership based on the received attribute data, wherein identifying the subset includes analyzing metadata associated with the plurality of digital assets to determine whether ownership information corresponding to a digital asset is absent or untraceable;

determining, by a prioritization rules engine, a risk level for each digital asset in the subset of digital assets based on the received attribute data, wherein the risk level measures a susceptibility of each digital asset to potential attacks, wherein the determining the risk level for each digital asset includes:

applying a plurality of prioritization rules to a digital asset from the subset of digital assets to generate a plurality of priority scores; and generating the risk level for the digital asset based on the plurality of priority scores;

calculating, by a remediation module, a remediation date for the digital asset based on the risk level corresponding to the digital asset; and performing a remediation action on each digital asset in the subset of digital assets, wherein the remediation action is based on the risk level of each digital asset.

2. The method as in claim 1, further comprising transmitting a notification associated with a digital asset from the subset of digital assets when the risk level corresponding to the digital asset is greater than a predefined threshold.

3. The method as in claim 1, wherein performing the remediation action includes:

calculating a remediation date based on the risk level of a digital asset, wherein the remediation date corresponds to a date to decommission the digital asset; and notifying an owner of the digital asset of the remediation date.

4. The method as in claim 1, wherein a prioritization rule classifies the digital asset into one of a plurality of predefined categories based on a type parameter of the digital asset, a functionality of the digital asset, and a criticality parameter of the digital asset.

5. The method as in claim 1, wherein a prioritization rule determines whether the digital asset is actively managed, monitored, deprecated, or supervised.

6. The method as in claim 1, wherein a prioritization rule determines an activity level of the digital asset.

7. The method as in claim 1, wherein a prioritization rule determines a network segment within which the digital asset resides.

8. The method as in claim 1, wherein a prioritization rule analyzes a completeness and an accuracy of metadata belonging to the digital asset.

9. The method as in claim 1, wherein a prioritization rule evaluates resource consumption of the digital asset.

10. The method as in claim 1, wherein a prioritization rule evaluates whether the digital asset complies with a regulatory standard, an internal policy, or an industry regulation.

11. The method as in claim 1, wherein determining the risk level for each digital asset includes applying a machine learning model to the received attribute data corresponding to a digital asset from the subset of digital assets to generate a risk level.

12. The method as in claim 11, further comprising visualizing a decision tree within the machine learning model on a graphical user interface of a display.

13. The method as in claim 11, wherein the machine learning model is validated using a confusion matrix.

14. The method as in claim 11, further comprising generating SHAP values corresponding to the received attribute data and determining one or more important features within the received attribute data based on SHapley Additive explanations values.

15. A system comprising:

one or more processors;

a non-transitory computer-readable medium storing a program executable by the one or more processors, the program comprising sets of instructions for operations comprising:

receiving, from one or more cloud service application programming interfaces (APIs), attribute data associated with a plurality of digital assets in a computing environment deployed within a computing environment comprising a plurality of virtual resources;

identifying, by an asset management module, a subset of the plurality of digital assets having unknown ownership based on the received attribute data, wherein identifying the subset includes analyzing metadata associated with the plurality of digital assets to determine whether ownership information corresponding to a digital asset is absent or untraceable;

determining, by a prioritization rules engine, a risk level for each digital asset in the subset of digital assets based on the received attribute data, wherein the risk level measures a susceptibility of each digital asset to potential attacks, wherein the determining the risk level for each digital asset includes:

applying a plurality of prioritization rules to a digital asset from the subset of digital assets to generate a plurality of priority scores; and generating the risk level for the digital asset based on the plurality of priority scores;

calculating, by a remediation module, a remediation date for the digital asset based on the risk level corresponding to the digital asset; and performing a remediation action on each digital asset in the subset of digital assets, wherein the remediation action is based on the risk level of each digital asset.

16. The system of claim 15, wherein the program further comprises sets of instructions for transmitting a notification associated with a digital asset from the subset of digital assets when the risk level corresponding to the digital asset is greater than a predefined threshold.

17. A non-transitory computer-readable medium storing a program executable by one or more processors, the program comprising sets of instructions for performing operations comprising:

receiving, from one or more cloud service application programming interfaces (APIs), attribute data associated with a plurality of digital assets in a computing environment deployed within a computing environment comprising a plurality of virtual resources;

identifying, by an asset management module, a subset of the plurality of digital assets having unknown ownership based on the received attribute data, wherein identifying the subset includes analyzing metadata associated with the plurality of digital assets to determine whether ownership information corresponding to a digital asset is absent or untraceable;

determining, by a prioritization rules engine, a risk level for each digital asset in the subset of digital assets based on the received attribute data, wherein the risk level measures a susceptibility of each digital asset to potential attacks, wherein the determining the risk level for each digital asset includes:

applying a plurality of prioritization rules to a digital asset from the subset of digital assets to generate a plurality of priority scores; and generating the risk level for the digital asset based on the plurality of priority scores;

calculating, by a remediation module, a remediation date for the digital asset based on the risk level corresponding to the digital asset; and performing a remediation action on each digital asset in the subset of digital assets, wherein the remediation action is based on the risk level of each digital asset.

18. The non-transitory computer-readable medium of claim 17, wherein the program further comprises sets of instructions for transmitting a notification associated with a digital asset from the subset of digital assets when the risk level corresponding to the digital asset is greater than a predefined threshold.

* * * * *